United States Patent
Kitamura

(10) Patent No.: US 10,334,126 B2
(45) Date of Patent: Jun. 25, 2019

(54) DISPLAY APPARATUS

(71) Applicant: KYOCERA Document Solutions Inc., Osaka (JP)

(72) Inventor: Tetsuro Kitamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/933,034

(22) Filed: Mar. 22, 2018

(65) Prior Publication Data

US 2018/0309883 A1 Oct. 25, 2018

(30) Foreign Application Priority Data

Apr. 21, 2017 (JP) .................................. 2017-084638

(51) Int. Cl.
| | |
|---|---|
| H04N 1/00 | (2006.01) |
| G03G 15/00 | (2006.01) |
| G02B 27/01 | (2006.01) |
| G06F 3/0481 | (2013.01) |
| G06F 3/0488 | (2013.01) |

(52) U.S. Cl.
CPC ....... H04N 1/00411 (2013.01); G02B 27/017 (2013.01); G03G 15/502 (2013.01); G03G 15/5016 (2013.01); H04N 1/00251 (2013.01); H04N 1/00336 (2013.01); G02B 2027/014 (2013.01); G02B 2027/0138 (2013.01); G02B 2027/0178 (2013.01); G02B 2027/0187 (2013.01); G06F 3/04817 (2013.01); G06F 3/04883 (2013.01); H04N 1/00482 (2013.01)

(58) Field of Classification Search
CPC ................................................ H04N 1/00411
USPC ......................................................... 358/1.15
See application file for complete search history.

(56) References Cited

U.S. PATENT DOCUMENTS

| | | | |
|---|---|---|---|
| 2013/0127725 A1* | 5/2013 | Sugimoto | G06F 3/02 345/168 |
| 2014/0126018 A1* | 5/2014 | Sugimoto | G06F 3/013 358/1.15 |
| 2016/0085382 A1 | 3/2016 | Suzuki et al. | |
| 2016/0147492 A1 | 5/2016 | Fugate et al. | |

FOREIGN PATENT DOCUMENTS

| | | |
|---|---|---|
| JP | 2016-62393 A | 4/2016 |
| JP | 2016-126712 A | 7/2016 |

OTHER PUBLICATIONS

Extended European Search Report dated Sep. 18, 2018, issued by the European Patent Office in corresponding application EP 18164735.5.

* cited by examiner

*Primary Examiner* — Jacky X Zheng
(74) *Attorney, Agent, or Firm* — Stein IP, LLC

(57) ABSTRACT

A display apparatus has a camera portion which shoots an operation panel, a display portion which displays information while allowing a user to see the operation panel, and a control portion which recognizes the position of the operation panel in the display area of the display portion and the currently displayed screen currently being displayed by the operation panel and which makes the display portion display, in such a way as not to overlap the operation panel, item information indicating the item description of an item button arranged on a screen to which a shift is possible from the currently displayed screen.

8 Claims, 13 Drawing Sheets

FIG.14
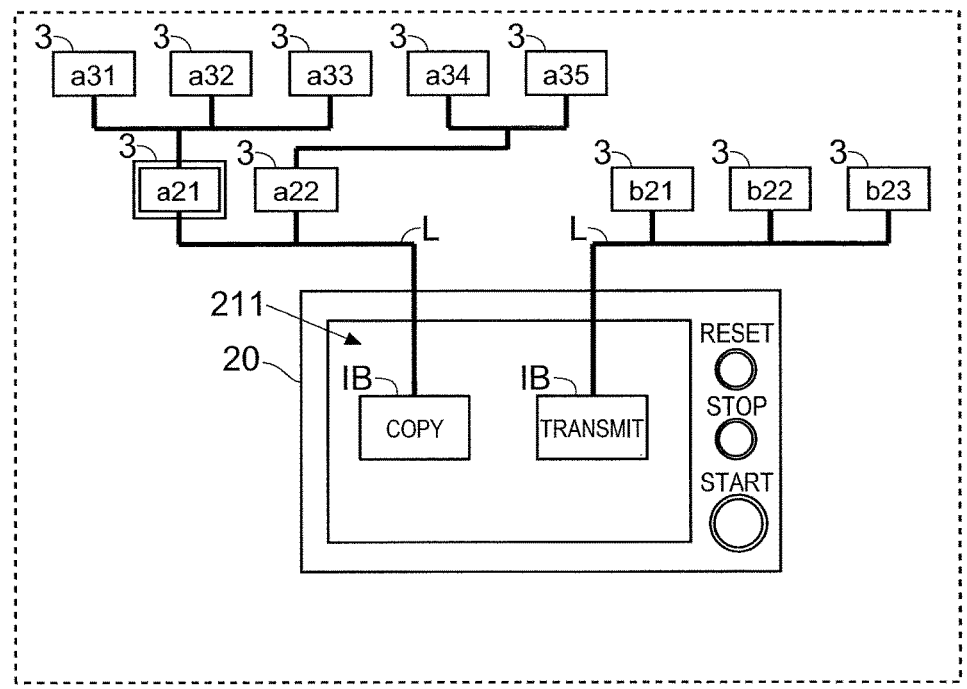
ITEM SPECIFYING OPERATION
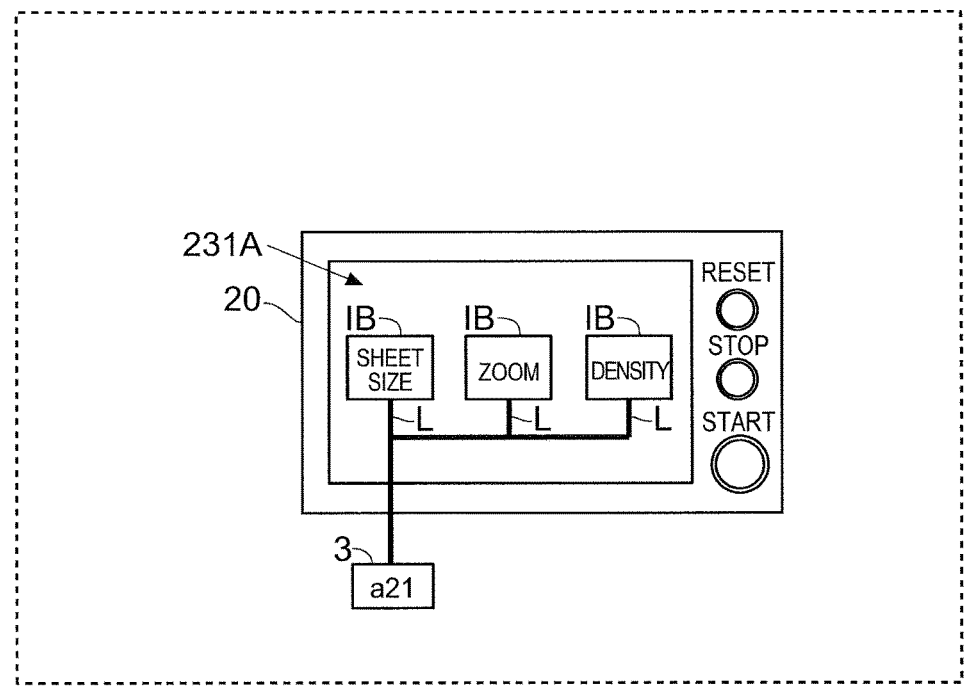
PANEL SCREEN SHIFT

DISPLAY APPARATUS

INCORPORATION BY REFERENCE

This application is based upon and claims the benefit of priority from the corresponding Japanese Patent Application No. 2017-084638 filed on Apr. 21, 2017, the entire contents of which are incorporated herein by reference.

BACKGROUND

The present disclosure relates to a display apparatus that assists a user in operating an operation panel.

An apparatus such as a multifunction peripheral or a copier is provided with an operation panel. The operation panel displays a screen on which buttons are arranged, and accepts from the user operations (operations on the buttons) for making settings and entering instructions as to printing.

In the conventional operation panel, when a predetermined operation is performed on the currently displayed screen, screens on a hierarchical level lower than the currently displayed screen are partly displayed. This permits the user to know what buttons are arranged on the screens on the hierarchical level lower than the screen that is currently being displayed on the operation panel.

SUMMARY

A display apparatus according to the present disclosure includes a camera portion, a display portion, and a control portion. The camera portion shoots an operation panel that displays a screen having an item button arranged in it and that accepts an operation on the item button from the user. The display portion displays information while allowing the user to see the operation panel. The control portion recognizes, based on shot data obtained through the shooting of the operation panel by the camera portion, the position of the operation panel in the display area of the display portion and the screen currently being displayed by the operation panel as a currently displayed screen, and makes the display portion display item information indicating the item description of the item button arranged on a screen to which a shift is possible from the currently displayed screen such that the item information does not overlap the operation panel.

BRIEF DESCRIPTION OF THE DRAWINGS

FIG. 14 is a diagram illustrating an item specifying operation accepted by the display apparatus according to the embodiment of the present disclosure;

DETAILED DESCRIPTION

A display apparatus according to one embodiment of the present disclosure will be described below, with a head-mounted display taken as an example. In the following description, the head-mounted display according to the embodiment is referred to as the "HMD" and is identified by the reference sign "1".

For example, the HMD 1 is worn by a user of an image forming apparatus (a printing device such as a multifunction peripheral or a copier). The image forming apparatus can be, but is not limited to, a multifunction peripheral furnished with a plurality of functions such as a copying function and a transmitting function whereby scanned data is transmitted to an external appliance. In the following description, the image forming apparatus used by the user wearing the HMD 1 is identified by the reference sign "2".

<Configuration of the HMD>

The HMD 1 is in the form of eyeglasses, and displays various kinds of information in its part corresponding to the lenses of the eyeglasses (displays information in front of the user's eyes). The HMD 1 also shoots the scene (objects) in front of the user's eyes.

Figure 1:
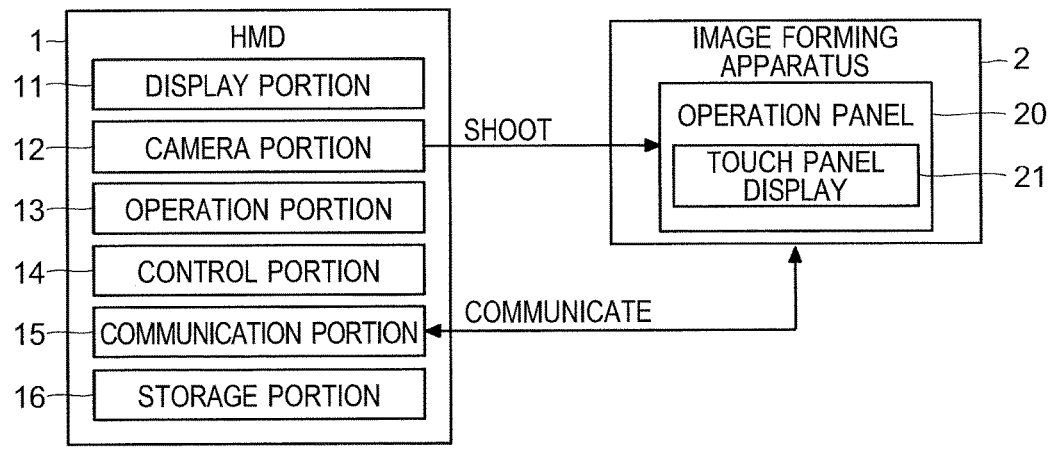
FIG. 1 is a diagram showing the configuration of a display apparatus according to one embodiment of the present disclosure.

As shown in FIG. 1, the HMD 1 includes a display portion 11, a camera portion 12, an operation portion 13, a control portion 14, a communication portion 15, and a storage portion 16. The display portion 11, the camera portion 12, the operation portion 13, the control portion 14, the communication portion 15, and the storage portion 16 are, though not so illustrated, disposed on a frame in the form of eyeglasses.

The display portion 11 performs display. The display portion 11 is arranged at a position opposite the eyes of the user wearing the HMD 1. Thus, various kinds of information are displayed in front of the user's eyes. When the image forming apparatus 2 is present in front of the user's eyes, while the image forming apparatus 2 (including an operation panel 20, which will be described later) is visually recognized by the user, information to be presented to the user can be displayed. For example, an optically transmissive (optically see-through) display device that transmits outside light is used as the display portion 11.

The camera portion 12 performs shooting. The camera portion 12 includes a CCD camera or the like, and is arranged at a position where it can shoot in the direction of the field of view of the user wearing the HMD 1. Thus, the scene (objects) in front of the user's eyes is shot. When the image forming apparatus 2 is present in front of the eyes of the user wearing the HMD 1, the image forming apparatus 2 (including the operation panel 20, which will be described later) can be shot. The camera portion 12 outputs shot data obtained through shooting.

The operation portion 13 accepts from the user operations for making various settings as to the display and shooting by the HMD 1. When a mobile terminal such as a smartphone owned by the user is communicably connected to the HMD 1, also from the mobile terminal, various settings as to the display and shooting by the HMD 1 can be made.

The control portion 14 includes a CPU which operates based on a control program and data, and executes various kinds of processing for controlling the HMD 1. For example, the control portion 14 controls the display by the display portion 11, and controls the shooting by the camera portion 12. The display portion 11 also detects various operations that the operation portion 13 accepts from the user.

The communication portion 15 is a communication interface for communicably connecting the HMD 1 to an external appliance, and includes a communication circuit and the like. Between the HMD 1 and the external appliance, communication is possible based on, but not limited to, a near-filed wireless communication standard or a wireless LAN standard. Using the communication portion 15, the control portion 14 communicates with the external appliance. For example, using the communication portion 15, the control portion 14 communicates with the image forming apparatus 2 to exchange various kinds of information with the image forming apparatus 2.

The storage portion 16 includes nonvolatile memory (ROM) and volatile memory (RAM), and stores programs and data for making the control portion 14 (CPU) operate. The storage portion 16 also stores display data for displaying item information 3, which will be described later.

<Display Screens on the Operation Panel>

The image forming apparatus 2 includes an operation panel 20. The operation panel 20 is operated by the user of the HMD 1 (the user wearing the HMD 1).

The operation panel 20 includes a touch panel display 21. The touch panel display 21 displays a screen on which software buttons (an operation accepting region in which touch operations from the user are accepted) are arranged, and accepts touch operations on the software buttons. For example, the operation panel 20 makes the touch panel display 21 display screens 200 (211, 221A, 231A, and 241A) as shown in FIGS. 2 to 5. The display screens 200 displayed by the operation panel 20 include many other. The software buttons arranged on the display screens 200 displayed by the operation panel 20 are in varying forms. For example, in the operation accepting region on a screen 200, an image (including an icon) in the shape of a button may be displayed; or, in the operation accepting region on a screen 200, a text image alone may be displayed.

Figure 6:
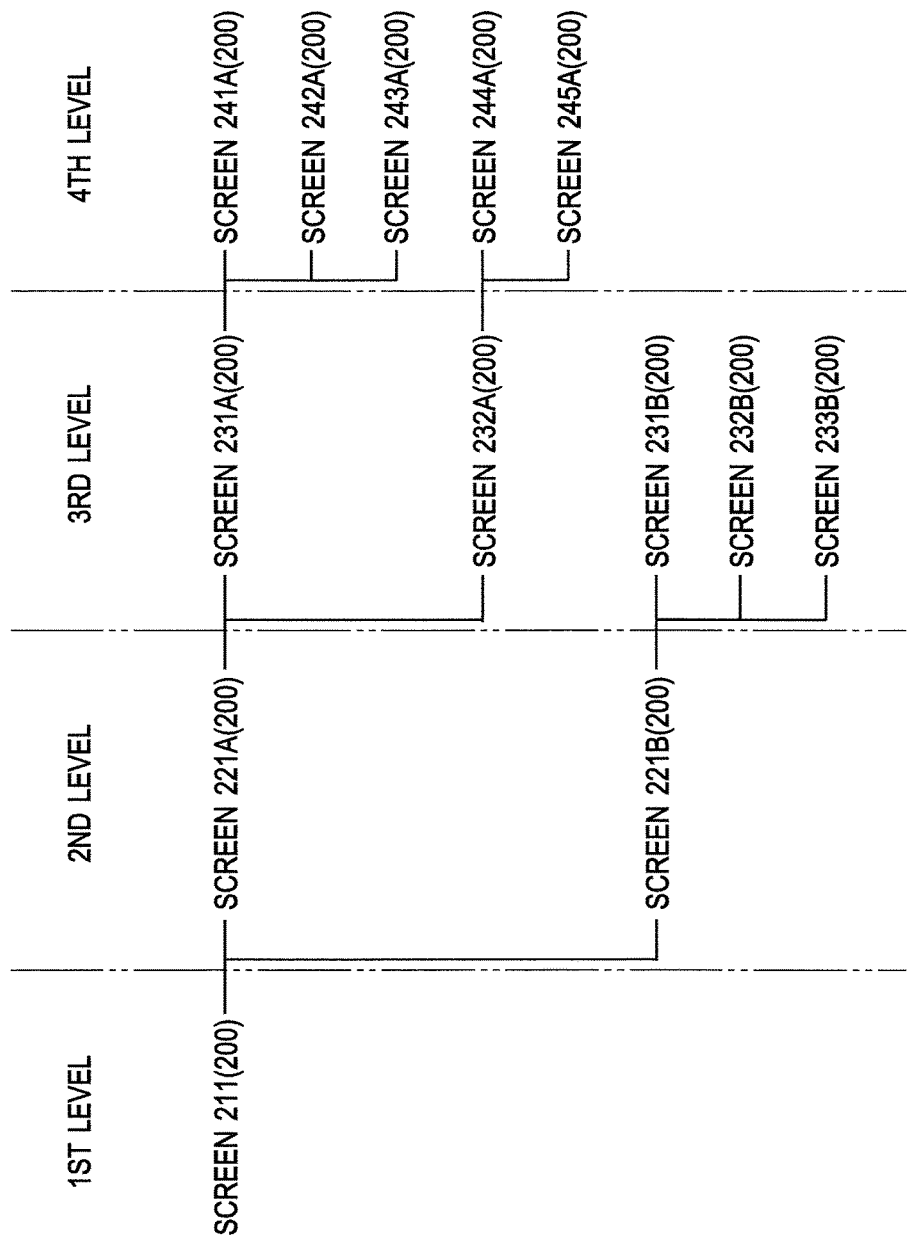
FIG. 6 is a diagram showing the hierarchical structure of display screens on the operation panel.

Here, as shown in FIG. 6, the display screens 200 displayed by the operation panel 20 have a hierarchical structure (are in a hierarchy). When a predetermined operation is performed on the operation panel 20, a switch occurs from the current screen 200 to a screen 200 on another hierarchical level. The hierarchical structure shown in FIG. 6 is merely one example and is not meant as any limitation.

Specifically, in some of the screens 200 displayed by the operation panel 20, item buttons IB (see FIGS. 2 to 4) are arranged. No item buttons IB are arranged on a screen 200 on the lowest hierarchical level. When the user performs a touch operation on an item button IB, a shift occurs from the current screen 200 to a screen 200 on the one level lower hierarchical level.

In the example shown in FIG. 6, while the screen 200 (screen 211) on the first hierarchical level, which is the highest hierarchical level, is being displayed, when the user performs a touch operation on an item button IB, a shift occurs from the screen 211 on the first hierarchical level to a screen 200 (either of screens 221A and 221B) on the second hierarchical level.

While the screen 221A on the second hierarchical level is being displayed, when the user performs a touch operation on an item button IB, a shift occurs from the screen 221A on the second hierarchical level to a screen 200 (either of screens 231A and 232A) on the third hierarchical level.

While the screen 221B on the second hierarchical level is being displayed, when the user performs a touch operation on an item button IB, a shift occurs from the screen 221B on the second hierarchical level to a screen 200 (one of screens 231B, 232B, and 233B) on the third hierarchical level. For example, the screens 231B, 232B, and 233B are screens on the lowest hierarchical level, and therefore no item buttons IB are arranged on the screens 231B, 232B, and 233B.

While the screen 231A on the third hierarchical level is being displayed, when the user performs a touch operation on an item button IB, a shift occurs to a screen 200 (one of screens 241A, 242A, and 243A) on the fourth hierarchical level. For example, the screens 241A, 242A, and 243A are screens on the lowest hierarchical level, and therefore no item buttons IB are arranged on the screens 241A, 242A, and 243A.

While the screen 232A on the third hierarchical level is being displayed, when the user performs a touch operation on an item button IB, a shift occurs to a screen 200 (either of 244A and 245A) on the fourth hierarchical level. For example, the screens 244A and 245A are screens on the lowest hierarchical level, and therefore no item buttons IB are arranged on the screens 244A and 245A.

On some of the screens 200 displayed by the operation panel 20, a return button BB (see FIGS. 3 to 5) is arranged. No return button BB is arranged on the screen 200 at the highest hierarchical level. When the user performs a touch operation on a return button BB, a shift occurs from the current screen 200 to a screen 200 on the one level higher hierarchical level. A hardware button corresponding to the return button BB may be provided on the operation panel 20.

Figure 2:
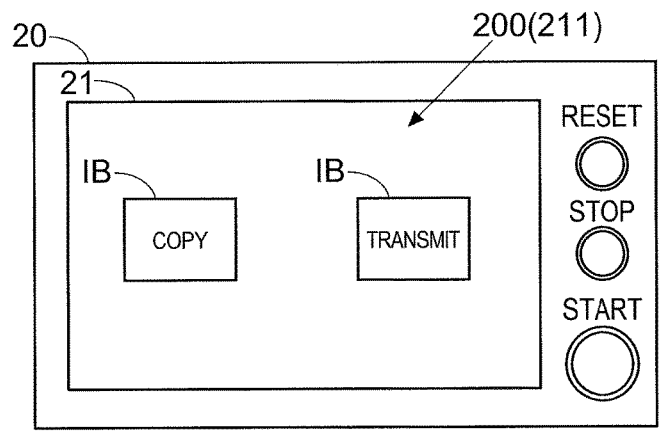
FIG. 2 is a diagram showing a display screen (home screen) on an operation panel.

The screen 211 on the operation panel 20 shown in FIG. 2 is a home screen for accepting from the user the choice of a function to be used out of the plurality of functions of the image forming apparatus 100, and corresponds to the screen on the first hierarchical level (highest hierarchical level). On the home screen 211, there are arranged, as item buttons IB, a copy button for choosing the copying function as the function to be used and a transmit button for choosing the transmitting function as the function to be used.

Figure 3:
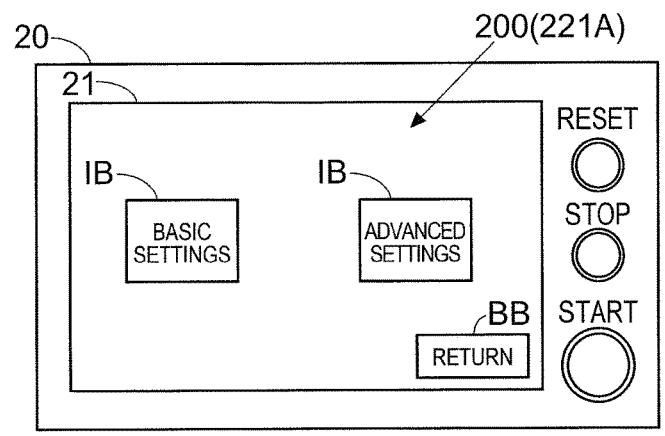
FIG. 3 is a diagram showing a display screen (basic/advanced selection screen) on the operation panel.

The screen 221A on the operation panel 20 shown in FIG. 3 is a basic/advanced selection screen for accepting from the user the selection of whether to make basic settings or advanced settings, and corresponds to a screen on the second hierarchical level. The basic/advanced selection screen 221A is displayed when a touch operation is performed on the copy button arranged as an item button IB on the home screen 211 (see FIG. 2). On the basic/advanced selection screen 221A, there are arranged, as item buttons IB, a basic settings button for indicating an intention to make basic settings and an advanced settings button for indicating an intention to make advanced settings.

Figure 4:
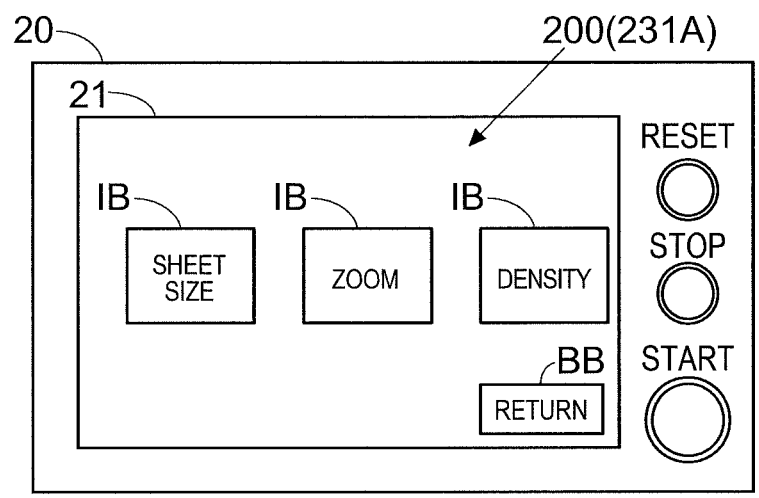
FIG. 4 is a diagram showing a display screen (basic settings screen) on the operation panel.

The screen 231A on the operation panel 20 shown in FIG. 4 is a basic settings screen for accepting from the user the selection of a setting item for which the user wishes to set (change) the set value out of setting items related to the copying function, and corresponds to a screen on the third hierarchical level. The basic settings screen 231A is displayed when a touch operation is performed on the basic settings button arranged as an item button IB on the basic/advanced selection screen 221A (see FIG. 3). On the basic settings screen 231A, there are arranged, as item buttons IB, a sheet size button for indicating an intention to make a sheet size setting, a zoom button for indicating an intention to make a zoom setting, and a density button for indicating an intention to make a density setting.

Figure 5:
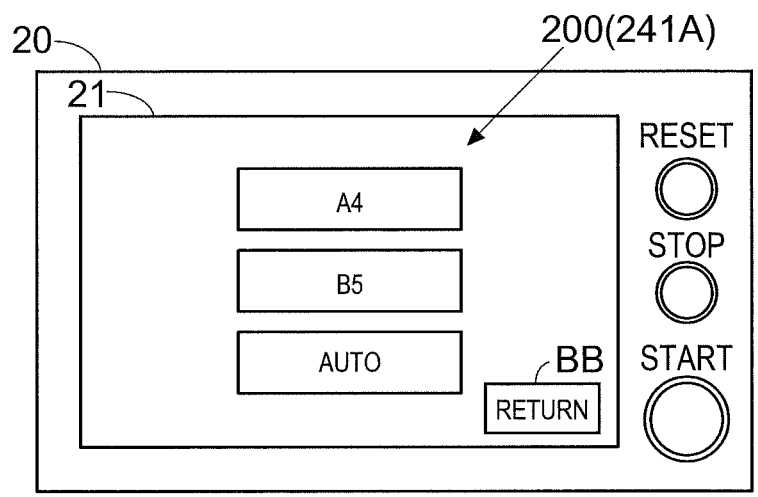
FIG. 5 is a diagram showing a display screen (sheet size screen) on the operation panel.

The screen 241A on the operation panel 20 shown in FIG. 5 is a sheet size screen for accepting from the user a sheet size setting, and corresponds to a screen on the fourth hierarchical level. The sheet size screen 241A is displayed when a touch operation is performed on the sheet size button arranged as an item button IB on the basic settings screen 231A (see FIG. 4).

On the basic/advanced selection screen 221A (see FIG. 3), the basic settings screen 231A (see FIG. 4), and the sheet size screen 241A (see FIG. 5), the return button BB is arranged. On the home screen 211 (FIG. 2), since it is a screen on the highest hierarchical level, no return button BB for returning to the home screen 211 is arranged.

While the basic/advanced selection screen 221A is being displayed, when the user performs a touch operation on the return button BB, the home screen 211 is displayed. While the basic settings screen 231A is being displayed, when the user performs a touch operation on the return button BB, the basic/advanced selection screen 221A is displayed. While the sheet size screen 241A is being displayed, when the user performs a touch operation on the return button BB, the basic settings screen 231A is displayed.

<Assistance in Panel Operations>
(Outline)

The manufacturer of the image forming apparatus 2 offers a panel application program (hereinafter referred to as the "panel application") for assisting the user in operating the operation panel 20. When the user, wearing the HMD 1 having the panel application installed on it, sees the screen 200 through the HMD 1, information for assisting the user in operating the operation panel 20 is displayed on the HMD 1. In other words, the HMD 1 (control portion 14) performs operation assist processing for assisting in panel operation.

Figure 7:
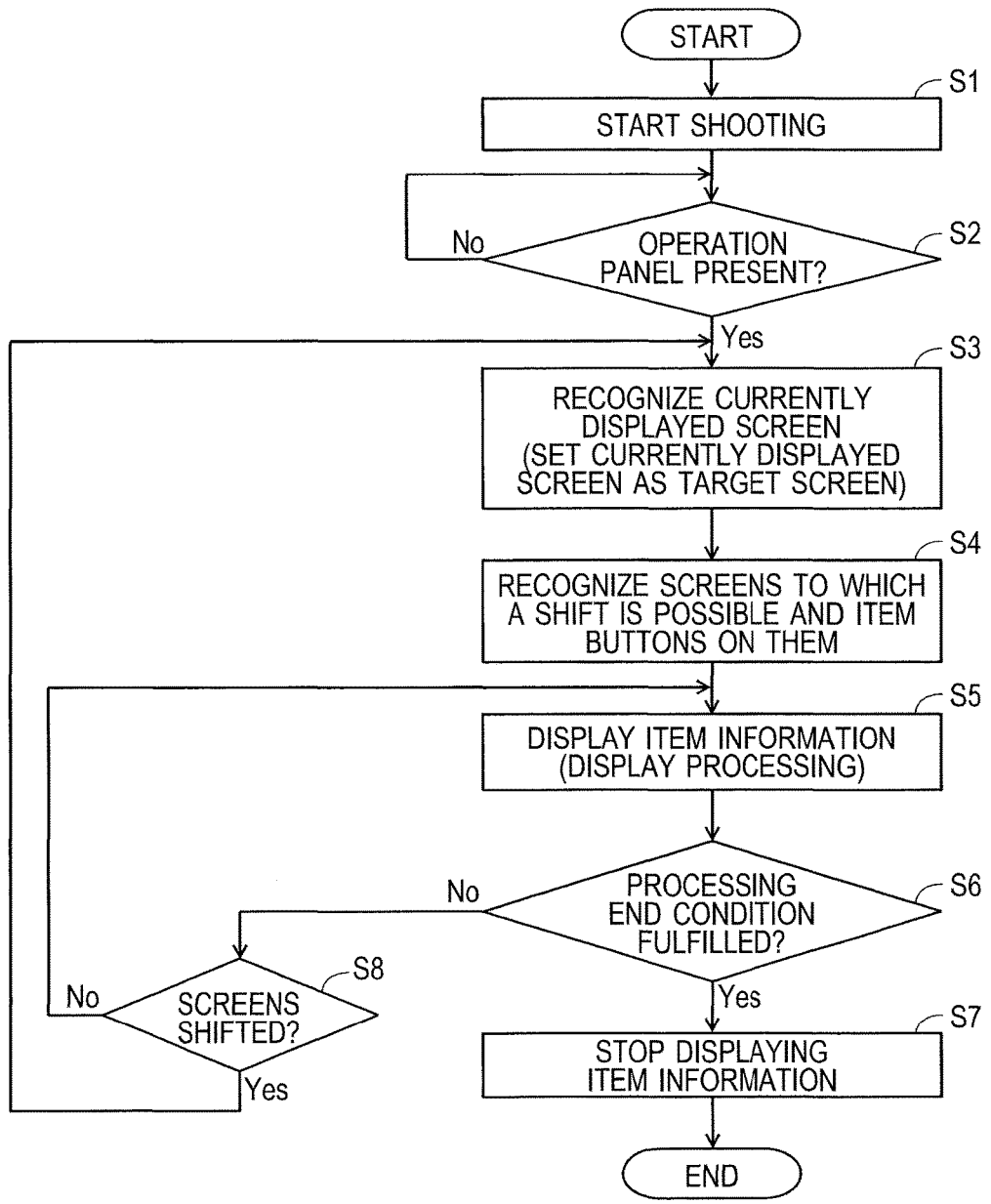
FIG. 7 is a diagram showing the flow of operation assist processing performed by the display apparatus according to the embodiment of the present disclosure.

Now, with reference to the flow chart shown in FIG. 7, the flow of the operation assist processing performed by the control portion 14 will be described. The flow in FIG. 7 starts when the operation portion 13 accepts from the user an operation for starting the panel application installed on the HMD 1 (when the control portion 14 detects that operation).

At step S1, the control portion 14 makes the camera portion 12 start shooting. At this time, the user, intending to operate the operation panel 20, approaches the operation panel 20 and see the operation panel 20.

At step S2, the control portion 14 acquires the shot data obtained through the shooting by the camera portion 12 and, based on the acquired shot data, checks whether or not the operation panel 20 is present in the shooting area of the camera portion 12. In other words, the control portion 14 checks whether or not the operation panel 20 has entered the user's field of view. For example, the storage portion 16 stores panel information that describes the features of the operation panel 20 (such as the contour, color, and the like of the operation panel 20). The control portion 14 performs predetermined image recognition processing on the shot data and, on detecting the features described in the panel information, judges that the operation panel 20 is present in the shooting area of the camera portion 12 (the operation panel 20 has entered the user's field of view).

If, at step S2, the control portion 14 judges that the operation panel 20 is present in the shooting area of the camera portion 12, an advance is made to step S3. On the other hand, if the control portion 14 judges that the operation panel 20 is not present in the shooting area of the camera portion 12, the processing at step S2 (the check by the control portion 14) is repeated.

At step S3, based on the shot data obtained through the shooting of the operation panel 20 by the camera portion 12, the control portion 14 recognizes the screen 200 that is currently being displayed on the operation panel 20 (hereinafter occasionally referred to as the currently displayed screen 200). For example, the storage portion 16 stores screen information that describes the features of the screens 200 that the operation panel 20 can display (such as the shapes of the buttons arranged on the screens 200, the symbols (including characters and numbers) with which the buttons are labeled, and the positions of the buttons). Based on the screen information, the control portion 14 recognizes the currently displayed screen 200. At this time, the control portion 14 sets the currently displayed screen 200 as a target screen.

At step S4, the control portion 14 recognizes the screens 200 to which a shift is possible from the currently displayed screen 200 (target screen) and the item buttons IB arranged on those screens 200. When the currently displayed screen 200 is a screen 200 on the highest hierarchical level, only the screens 200 on a hierarchical level lower than the currently displayed screen 200 are the screens 200 to which a shift is possible; when the currently displayed screen 200 is a screen 200 on the lowest hierarchical level, only the screens 200 on a hierarchical level higher than the currently displayed screen 200 are the screens 200 to which a shift is possible. When the currently displayed screen 200 is neither a screen 200 on the highest hierarchical level nor a screen 200 on the lowest hierarchical level, the screens 200 on hierarchical levels both higher and lower than the currently displayed screen 200 are the screens 200 to which a shift is possible.

For example, the storage portion 16 stores hierarchy information that indicates, as to each of the screens 200 that the operation panel 20 can display, the hierarchical level of the screen 200, the screens 200 on a higher hierarchical level, the screens 200 on a lower hierarchical level, and the like (information that indicates the hierarchical structure of the screens 200 that the operation panel 20 displays). The hierarchy information also includes information indicating the item buttons IB arranged on each of the screens 200 that the operation panel 20 can display. Based on the hierarchy information, the control portion 14 recognizes the screens 200 to which a shift is possible from the currently displayed screen 200 and the item buttons IB arranged on those screens 200.

Figure 8:
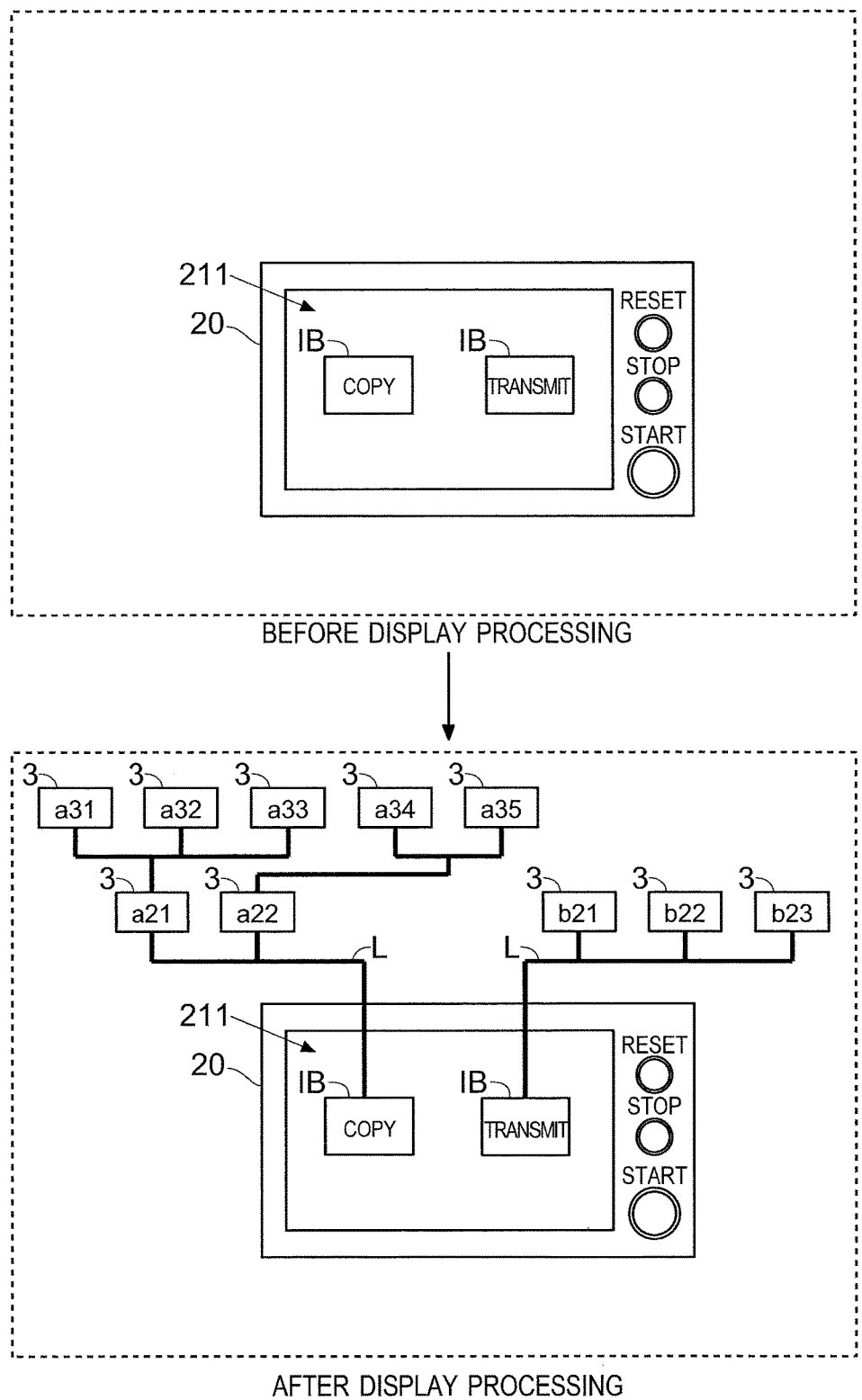
FIG. 8 is a diagram showing how what a user sees differs before and after the display apparatus according to the embodiment of the present disclosure performs display processing.
Figure 10:
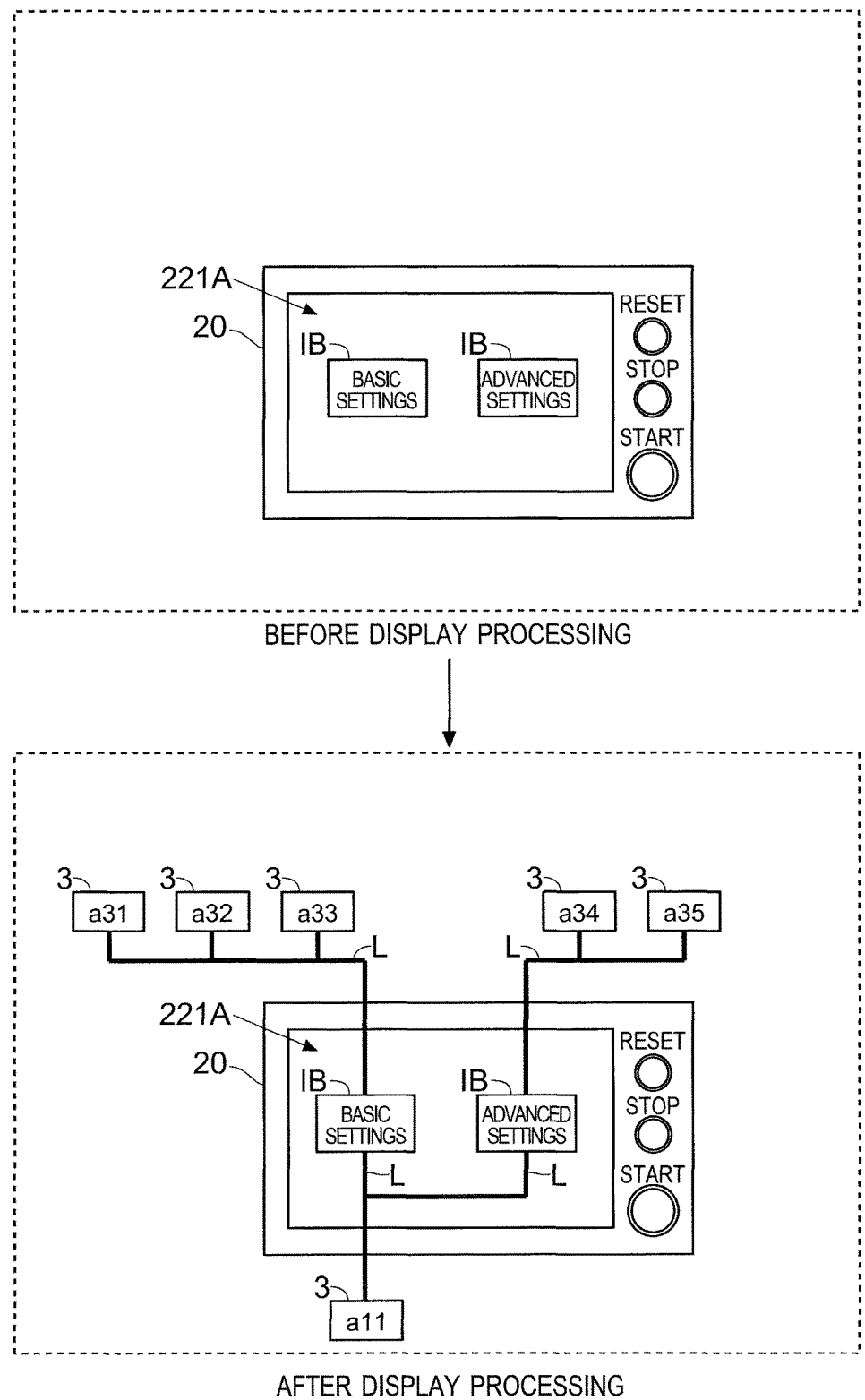
FIG. 10 is a diagram showing how what a user sees differs before and after the display apparatus according to the embodiment of the present disclosure performs display processing.

At step S5, the control portion 14 performs, as part of the operation assist processing, display processing to make the display portion 11 display item information 3 (see the lower section of FIG. 8, the lower section of FIG. 10, and the like)

that indicates the item descriptions of the item buttons IB arranged on the screens 200 to which a shift is possible from the currently displayed screen 200 (target screen). This will be discussed in detail later.

At step S6, the control portion 14 checks whether or not a condition for ending the display processing (processing end condition) is fulfilled. As a result, if the control portion 14 judges that a processing end condition is fulfilled, an advance is made to step S7; if the control portion 14 judges that no processing end condition is fulfilled, an advance is made to step S8.

For example, on detecting the operation portion 13 having accepted from the user an operation to end the panel application, the control portion 14 judges that a processing end condition is fulfilled. Also, on detecting the operation portion 13 having accepted from the user an operation to stop the shooting by the camera portion 12, the control portion 14 judges that a processing end condition is fulfilled. Also, on detecting the operation panel 20 no longer being present in the shooting area of the camera portion 12, the control portion 14 judges that a processing end condition is fulfilled. What is signified by the operation panel 20 no longer being present in the shooting area of the camera portion 12 is that the user has moved away from the operation panel 20 (the user no longer sees the operation panel 20).

When an advance is made to step S7, the control portion 14 ends the display processing. Specifically, the control portion 14 instructs the display portion 11 to stop the display of the item information 3.

When an advance is made to step S8, based on the shot data obtained through the shooting of the operation panel 20 by the camera portion 12, the control portion 14 checks whether or not the operation panel 20 has performed a shift of screens 200.

If the control portion 14 judges that the operation panel 20 has performed a shift of screens 200, an advance is made to step S3. In this case, the control portion 14 makes the display portion 11 stop the display of the item information 3 for a while, and performs the processing at steps S3 and S4. Then, at step S5, the control portion 14 performs the display processing again.

On the other hand, if the control portion 14 judges that the operation panel 20 has performed no shift of screens 200, an advance is made to step S5. In this case, the display of the item information 3 is continued.

(Display of Item Descriptions)

The display processing performed by the control portion 14 includes first processing and second processing, which will now be described specifically.

When performing the first processing, the control portion 14 recognizes, out of the screens 200 in a hierarchical level lower than the screen 200 set as the target screen (out of the screens 200 to which a shift is possible from the screen 200 set as the target screen), those screens 200 in which item buttons IB are arranged. Then, the control portion 14 performs, as the first processing, processing to make the display portion 11 display the item information 3 (see the lower section of FIG. 8, the lower section of FIG. 10, and the like) that indicates the item descriptions of the item buttons IB arranged on the screens 200 on the hierarchical level lower than the screen 200 set as the target screen.

For example, suppose that the home screen 211 (see FIG. 2) is set as the target screen. In this case, what the user sees changes as shown in FIG. 8. At the stage before the control portion 14 performs the display processing, as shown in the upper section of FIG. 8, the user sees the operation panel 20 as it is. Thereafter, when the control portion 14 performs the display processing, as shown in the lower section of FIG. 8, the item information 3 is displayed in front of the user's eyes. In FIG. 8, the user's field of view (the display area of the display portion 11) is indicated by broken lines. The same applies to FIGS. 10 and 12 to 16, which will be referred to in the following description.

Figure 9:
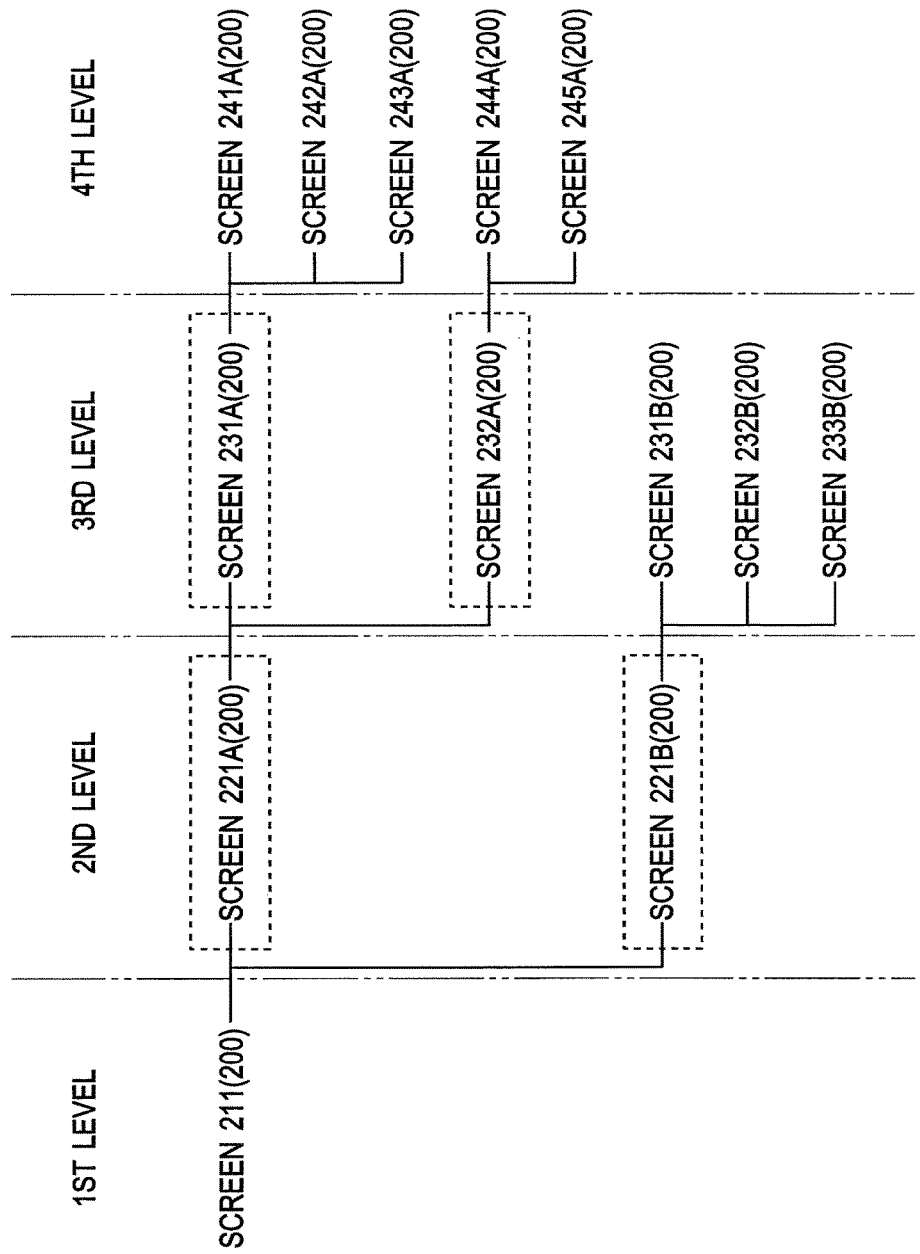
FIG. 9 is a diagram illustrating operation-panel screens on which item buttons corresponding to the item information shown in FIG. 8 are arranged.

When the home screen 211 is set as the target screen, the control portion 14 sets the item buttons IB arranged on the screens 200 on the hierarchical level lower than the home screen 211 as target buttons. Set as the target buttons at this time are, as shown in FIG. 9, the item buttons IB arranged on the screens 200 enclosed by broken lines out of the screens 200 that the operation panel 20 can display.

For example, on the basic/advanced selection screen 221A, there are arranged, as item buttons IB, the basic settings button and the advanced settings button (these buttons are set as target buttons). On the basic settings screen 231A, there are arranged, as item buttons IB, the sheet size button, the zoom button, and the density button (these buttons are set as target buttons).

Accordingly, when the home screen 211 is set as the target screen, the control portion 14 makes the display portion 11 display item information 3 that indicates the item description of the basic settings button (in the lower section of FIG. 8, indicated by the character string "a21"), item information 3 that indicates the item description of the advanced settings button (in the lower section of FIG. 8, indicated by the character string "a22"), item information 3 that indicates the item description of the sheet size button (in the lower section of FIG. 8, indicated by the character string "a31"), item information 3 that indicates the item description of the zoom button (in the lower section of FIG. 8, indicated by the character string "a32"), and item information 3 that indicates the item description of the density button (in the lower section of FIG. 8, indicated by the character string "a33").

Though no limitation is intended, the display portion 11 displays, as the item information 3, text information that indicates the item descriptions of the item buttons IB. The 11 may instead display, as the item information 3, symbols (icons) of the item buttons IB.

When the home screen 211 is set as the target screen, the item buttons IB arranged on the screen 232A are also target buttons (see FIG. 9). Accordingly, item information 3 that indicates the item descriptions of the item buttons IB arranged on the screen 232A (in the lower section of FIG. 8, indicated by the character strings "a34" and "a35") is also displayed.

Furthermore, when the home screen 211 is set as the target screen, the item buttons IB arranged on the screen 221B are also target buttons (see FIG. 9). Accordingly, item information 3 that indicates the item descriptions of the item buttons IB arranged on the screen 221B (in the lower section of FIG. 8, indicated by the character strings "b21", "b22", and "b23") is also displayed.

When performing the second processing, the control portion 14 recognizes the item buttons IB which are the item buttons IB arranged on the screens 200 on a hierarchical level higher than the operation panel 20 set as the target screen (the screens 200 from which a shift is possible from the screen 200 set as the target screen) and which are the item buttons IB operated when a shift to the screen 200 set as the target screen is performed. Then, the control portion 14 performs, as the second processing, operation to make the display portion 11 display the item information 3 (see the lower section of FIG. 10) that indicates the item descriptions of the item buttons IB operated when a shift to the screen 200 set as the target screen is performed.

For example, suppose that the basic/advanced selection screen 221A (see FIG. 3) is set as the target screen. In this case, the control portion 14 performs both the first and second processing. Accordingly, what the user sees changes as shown in FIG. 10. At the stage before the control portion 14 performs the display processing, as shown in the upper section of FIG. 10, the user sees the operation panel 20 as it is. Thereafter, when the control portion 14 performs the display processing, as shown in the lower section of FIG. 10, the item information 3 is displayed in front of the user's eyes.

Figure 11:
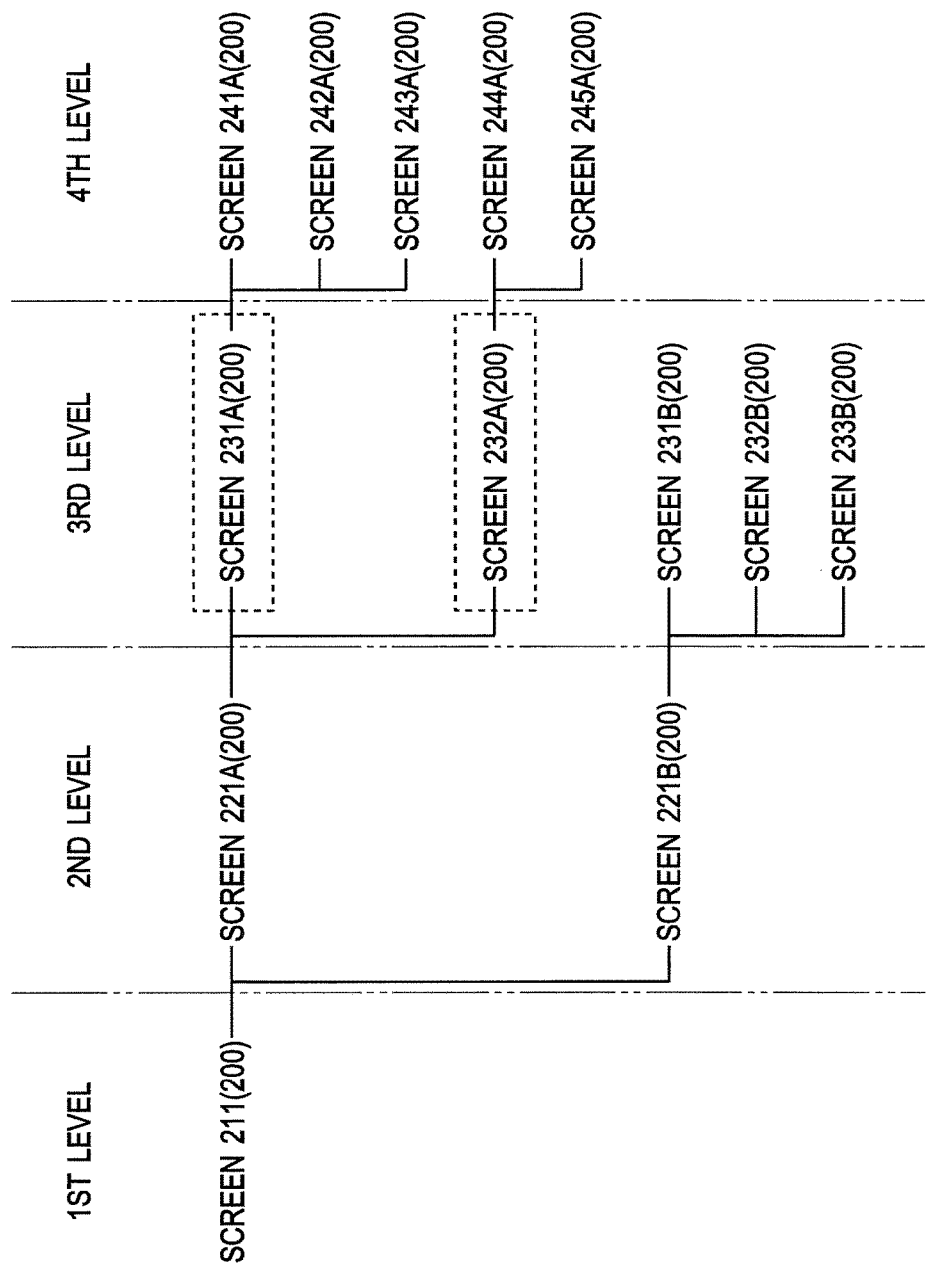
FIG. 11 is a diagram illustrating operation-panel screens on which item buttons corresponding to the item information shown in FIG. 10 are arranged.

When the basic/advanced selection screen 221A is set as the target screen, the control portion 14 sets the item buttons IB arranged on the screens 200 on the hierarchical level lower than the basic/advanced selection screen 221A as target buttons. Set as the target buttons at this time are, as shown in FIG. 11, the item buttons IB arranged on the screens 200 surrounded by broken limes out of the screens 200 that the operation panel 20 can display.

Accordingly, the control portion 14 makes the display portion 11 display item information 3 indicated by the character string "a31" (information indicating the item description of the sheet size button), item information 3 indicated by the character string "a32" (information indicating the item description of the zoom button), and item information 3 indicated by the character string "a33" (information indicating the item description of the density button). The control portion 14 makes the display portion 11 display, as the item information 3, also information indicating the item descriptions of the item buttons IB arranged on the screen 232A. That is, item information 3 indicated by the character strings "a34" and "a35" is also displayed.

Moreover, when the basic/advanced selection screen 221A is set as the target screen, the control portion 14 sets as target buttons also the item buttons IB that are operated when a shift to the basic/advanced selection screen 221A is performed. Set as the target button at this time is the copy button that is arranged as an item button IB on the home screen 211.

Accordingly, when the basic/advanced selection screen 221A is set as the target screen, the control portion 14 makes the display portion 11 further display item information that indicates the item description of the copy button (in the lower section of FIG. 10, indicated by the character string "all"). For example, the display portion 11 displays the item information 3 indicating the item descriptions of the item buttons IB arranged on the hierarchical level lower than the basic/advanced selection screen 221A in an upper part of the display area, and displays the item descriptions of the item buttons IB arranged on the hierarchical level higher than the basic/advanced selection screen 221A in a lower part of the display area.

During the display of the item information 3, based on the shot data obtained through the shooting of the operation panel 20 by the camera portion 12, the control portion 14 recognizes the positions of the item buttons IB in the display area of the display portion 11 as reference positions. In the example shown in FIG. 8, the positions of the copy button and the transmit button arranged as item buttons IB on the home screen 211 (their positions in the display area of the display portion 11) are taken as reference positions. In the example shown in FIG. 10, the positions of the basic settings button and the advanced settings button arranged as item buttons IB on the basic/advanced selection screen 221A (their positions in the display area of the display portion 11) are taken as reference positions. Then, as shown in FIGS. 8 and 10, the control portion 14 makes the display portion 11 display lines L that connects the item information 3 to the reference positions. In FIGS. 8 and 10, those lines L are indicated by thick lines. The same applies to FIGS. 12 to 16, which will be referred to in the following description.

Specifically, the display portion 11 displays lines L that connect the item information 3 (here referred to as the first lower-level item information 3) corresponding to the item buttons IB arranged on the screens 200 (here referred to as the first lower-level screens 200) in the hierarchical level one level lower than the screen 200 (the target screen) currently displayed on the operation panel 20 directly to the reference positions. The display portion 11 also displays lines L that connect the item information 3 (here referred to as the second lower-level item information 3) corresponding to the item buttons IB arranged on the screens 200 (here referred to as the second screens 200) in a hierarchical level lower than the first lower-level screens to the first lower-level item information 3. That is, lines L that connect the second lower-level item information 3 via the first lower-level item information 3 to the reference positions are displayed.

Moreover, the display portion 11 displays lines L that connect the item information 3 (here referred to as the higher-level item information 3) corresponding to the item buttons IB arranged on the screens 200 (here referred to as the higher-level screens 200) one level higher than the screen 200 (target screen) currently displayed on the operation panel 20 directly to the reference positions.

In the example shown in FIG. 8, the item information 3 indicated by the character strings "a21", "a22", "b21", "b22", and "b23" corresponds to the first lower-level item information; the item information 3 indicated by the character strings "a31", "a32", "a33", "a34", and "a35" correspond to the second lower-level item information.

To make it clear that the item buttons IB corresponding to the item information 3 indicated by the character strings "a21" and "a22" is displayed in response to an operation on the copy button on the home screen 211, the lines L extending from that item information 3 are connected to the reference position corresponding to the copy button. Likewise, to make it clear that the item buttons IB corresponding to the character strings "b21", "b22", and "b23" is displayed in response to an operation on the transmit button on the home screen 211, the lines L extending from that item information 3 are connected to the reference position corresponding to the transmit button.

In the example shown in FIG. 10, the item information 3 indicated by the character strings "a31", "a32", "a33", "a34", and "a35" corresponds to the first lower-level item information. The item information 3 indicated by the character string "all" corresponds to the higher-level item information.

To make it clear that the item buttons IB corresponding to the item information 3 indicated by the character strings "a31", "a32", and "a33" is displayed in response to an operation on the basic settings button on the basic/advanced selection screen 221A, the lines L extending from that item information 3 are connected to the reference position corresponding to the basic settings button. Likewise, to make it clear that the item buttons IB corresponding to the character strings "a34" and "a35" is displayed in response to an operation on the advanced settings button on the basic/advanced selection screen 221A, the lines L extending from that item information 3 are connected to the reference position corresponding to the advanced settings button.

Moreover, based on the shot data obtained through the shooting of the operation panel 20 by the camera portion 12, the control portion 14 recognizes the position of the operation panel 20 in the display area of the display portion 11. Then, the control portion 14 controls the display position of the item information 3 so that the operation panel 20 and the item information 3 do not overlap. The control portion 14 also controls the display positions of the lines L (the lengths, extension directions, and bent positions of the lines L).

Figure 12:
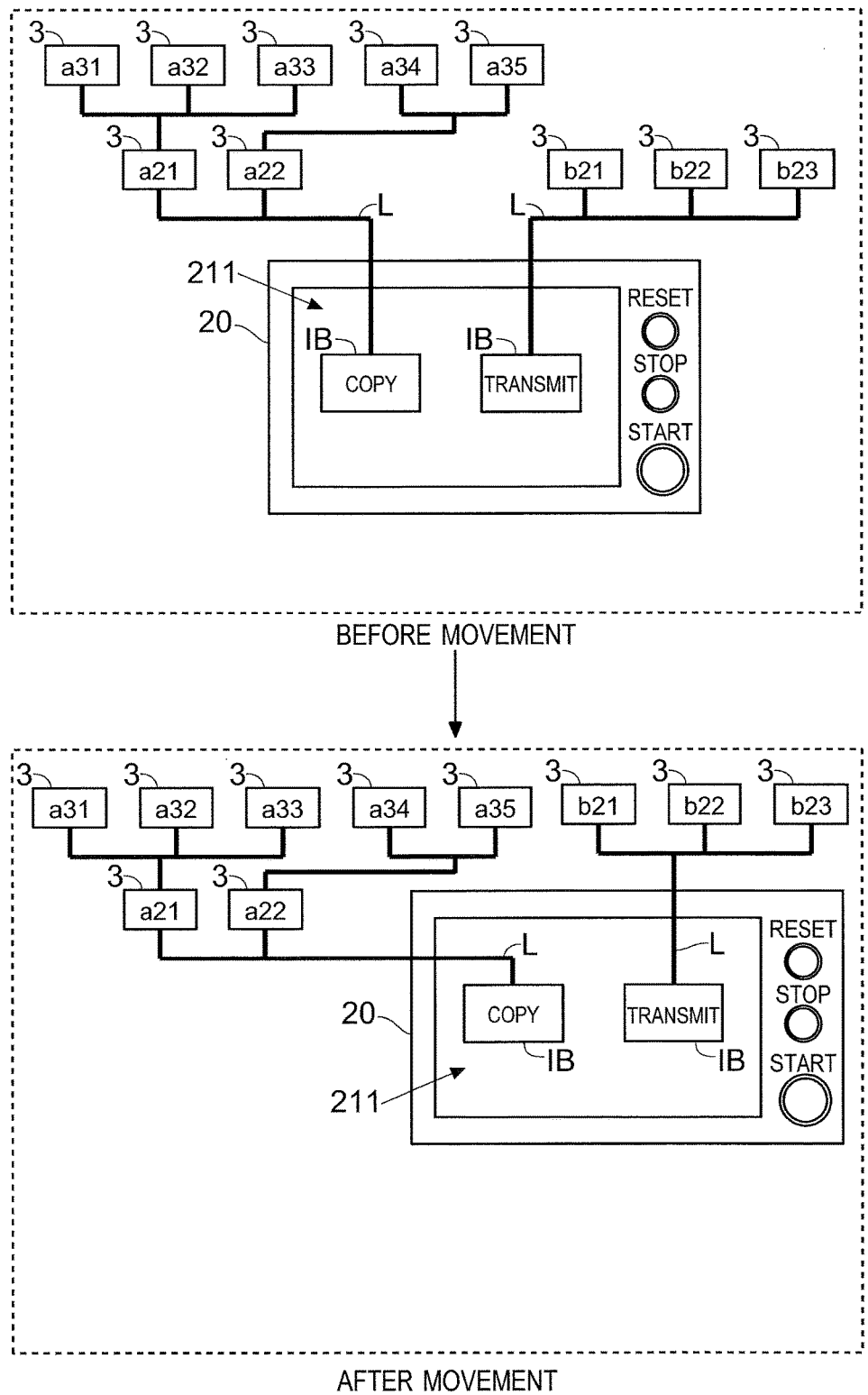
FIG. 12 is a diagram illustrating the control performed when the position of the operation panel in the display area of the display apparatus according to the embodiment has moved.

For example, suppose that, as shown in FIG. 12, the position of the operation panel 20 in the display area of the display portion 11 has moved in an upper rightward direction (a change has occurred from the state shown in the upper section of the diagram to the state shown in the lower section). That is, suppose that the user moved the line of sight in a lower leftward direction. In this case, the control portion 14 changes the display position of the item information 3. The control portion 14 also changes the lengths, extension directions, bent positions, and the like of the lines L.

Figure 13:
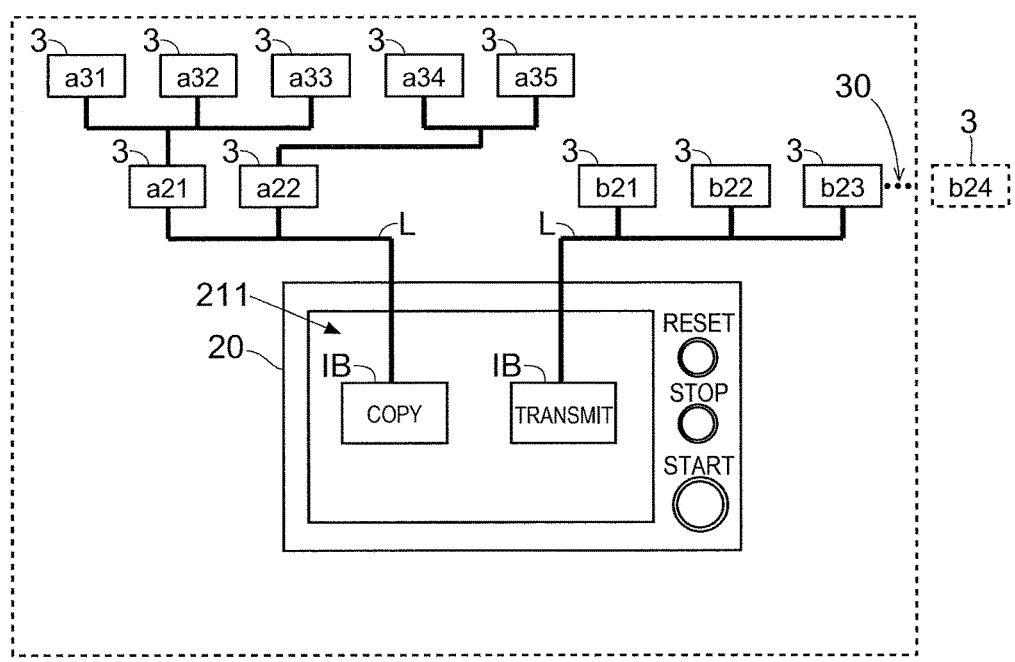
FIG. 13 is a diagram showing notification information displayed by the display apparatus according to the embodiment of the present disclosure.

Here, cases may arise where not all of the item information 3 to be displayed on the display portion 11 can be displayed in the display area of the display portion 11. For example, suppose that, as shown in FIG. 13, the part of the item information 3 indicated by the character string "b24" cannot be displayed in the display area of the display portion 11 (that part of the item information 3 is enclosed by broken lines for distinction from the rest of the item information 3). In this case, the control portion 14 makes the display portion 11 display notification information 30 to notify the user that there is a part of the item information 3 that is left undisplayed in the display are of the display portion 11 (hereinafter referred to as the undisplayed item information 3).

In the example shown in FIG. 13, the position at which to display the undisplayed item information 3 (information indicated by the character string "b24") is to the right of the item information 3 indicated by the character string "b23". In this case, the display portion 11 displays the notification information 30 to the right of the item information 3 indicated by the character string "b23". Though not illustrated, in a case where the position at which to display the undisplayed item information 3 is over the item information 3 indicated by the character string "a31", the notification information 30 is displayed over the item information 3 indicated by the character string "a31".

(Detecting a Gesture Operation)

During the display of the item information 3, based on the shot data obtained through the shooting by the camera portion 12, the control portion 14 detects a virtual operation (gesture operation) that the user performs in response to the item information 3. On detecting a gesture operation having been performed, the control portion 14, using the communication portion 15, communicates with the image forming apparatus 2 (operation panel 20), and transmits to the operation panel 20 information for shifting screens on the operation panel 20.

During the display of the item information 3, the control portion 14 checks whether or not a gesture operation previously defined as an item specifying operation has been performed. For example, the control portion 14 detects as an item specifying operation an operation of virtually tapping any part of the item information 3 currently being displayed.

On judging that an item specifying operation has been performed, the control portion 14 recognizes specified item information (the virtually tapped item information 3) which is the item information 3 specified by the item specifying operation. Then the control portion 14 transmits to the operation panel 20 information (screen shift command) for making the operation panel 20 perform a shift to the screen 200 to be displayed when the item button IB corresponding to the specified item information 3 is operated. For example, the screen shift command contains information that indicates as the shift destination the screen 200 to be displayed when the item button IB corresponding to the specified item information 3 is operated. On receiving the screen shift command, the operation panel 20 of the image forming apparatus 2 performs a shift to the screen 200 of the shift destination contained in the screen shift command.

For example, suppose that, as shown in the upper section of FIG. 14, while the operation panel 20 is displaying the home screen 211, an item specifying operation has been performed on the item information 3 indicated by the character string "a21". In the upper section of FIG. 14, the item information 3 on which the item specifying operation has been performed is enclosed by double lines. The item button IB corresponding to the item information 3 indicated by the character string "a21" is the basic settings button arranged on the basic/advanced selection screen 221A. In this case, as shown in the lower section of FIG. 14, the operation panel 20 performs a shift from the current screen 200 (home screen 211) to the basic settings screen 231A, which is the screen 200 to be displayed when the basic settings button is operated.

Moreover, during the display of the item information 3, the control portion 14 checks whether or not a previously defined first gesture operation has been performed. For example, the control portion 14 detects as the first gesture operation an operation of virtually flicking from left to right in the shooting area of the camera portion 12.

On judging that the first gesture operation has been performed, the control portion 14 recognizes the currently displayed screen 200 that the operation panel 20 is currently displaying, and transmits to the operation panel 20 information containing a first command for making the operation panel 20 perform a shift to the screen 200 most recently displayed out of the screens 200 on a hierarchical level higher than the currently displayed screen 200. On receiving the first command, the operation panel 20 of the image forming apparatus 2 performs a shift to the screen 200 most recently displayed out of the screens 200 on the hierarchical level higher than the currently displayed screen 200.

Figure 15:
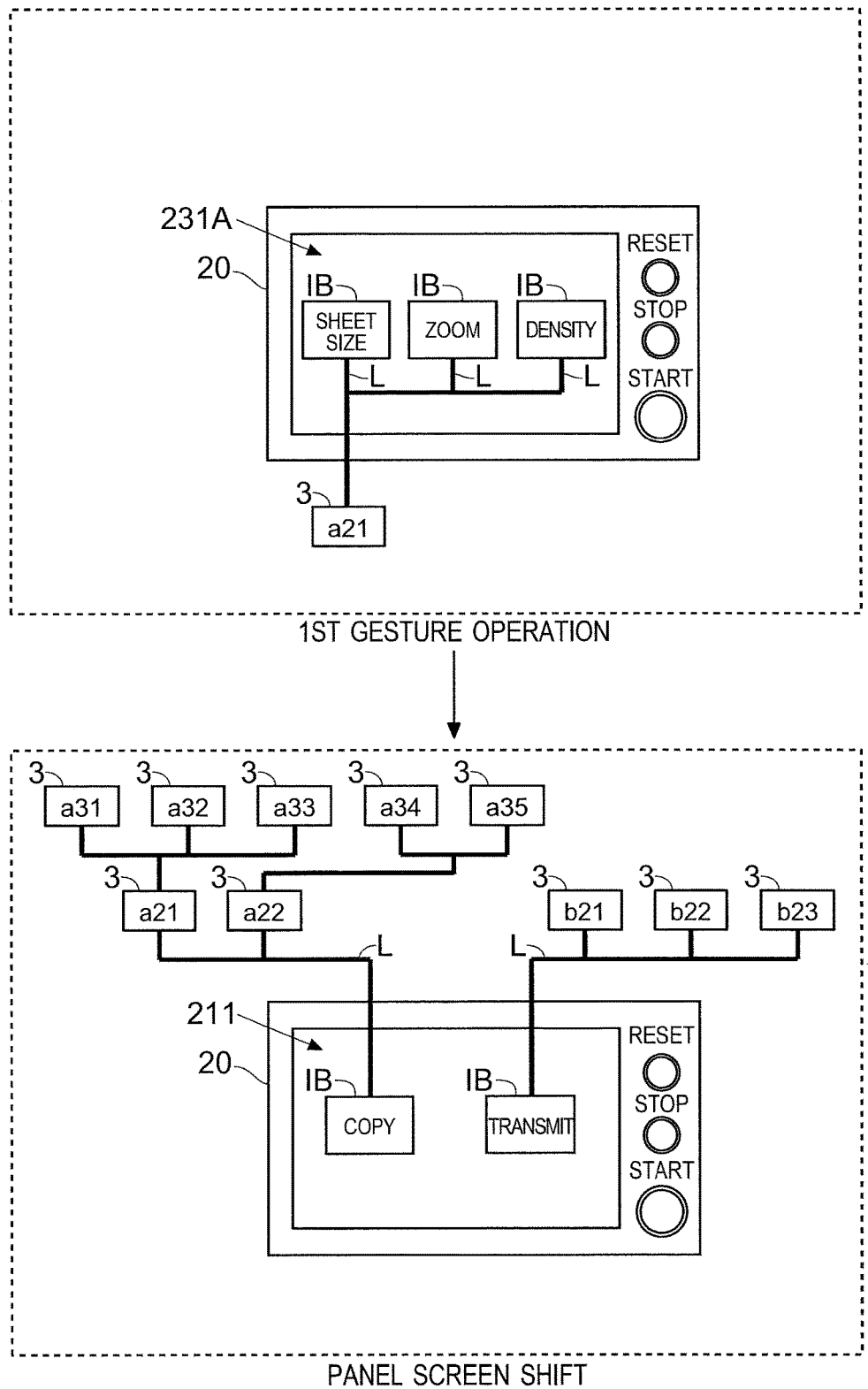
FIG. 15 is a diagram illustrating a first gesture operation accepted by the display apparatus according to the embodiment of the present disclosure.

For example, suppose that, in response to a screen shift command from the HMD 1 to the operation panel 20, the operation panel 20 has performed a shift from the home screen 211 to the basic settings screen 231A (see FIG. 14), and that, thereafter, as shown in the upper section of FIG. 15, in a state where the operation panel 20 continues to display the basic settings screen 231A, the first gesture operation is performed. In this case, as shown in the lower section of FIG. 15, the operation panel 20 performs a shift from the basic settings screen 231A to the home screen 211.

Moreover, during the display of the item information 3, the control portion 14 checks whether or not a previously defined second gesture operation has been performed. For example, the control portion 14 detects as the second gesture operation an operation of virtually flicking from right to left in the shooting area of the camera portion 12.

On judging that the second gesture operation has been performed, the control portion 14 recognizes the currently displayed screen 200 that the operation panel 20 is currently displaying, and transmits to the operation panel 20 information containing a second command for making the operation panel 20 perform a shift to the screen 200 most recently displayed out of the screens 200 on a hierarchical level lower than the screen 200. On receiving the second command, the operation panel 20 of the image forming apparatus 2 performs a shift to the screen 200 most recently displayed out of the screens 200 on the hierarchical level lower than the currently displayed screen 200.

Figure 16:
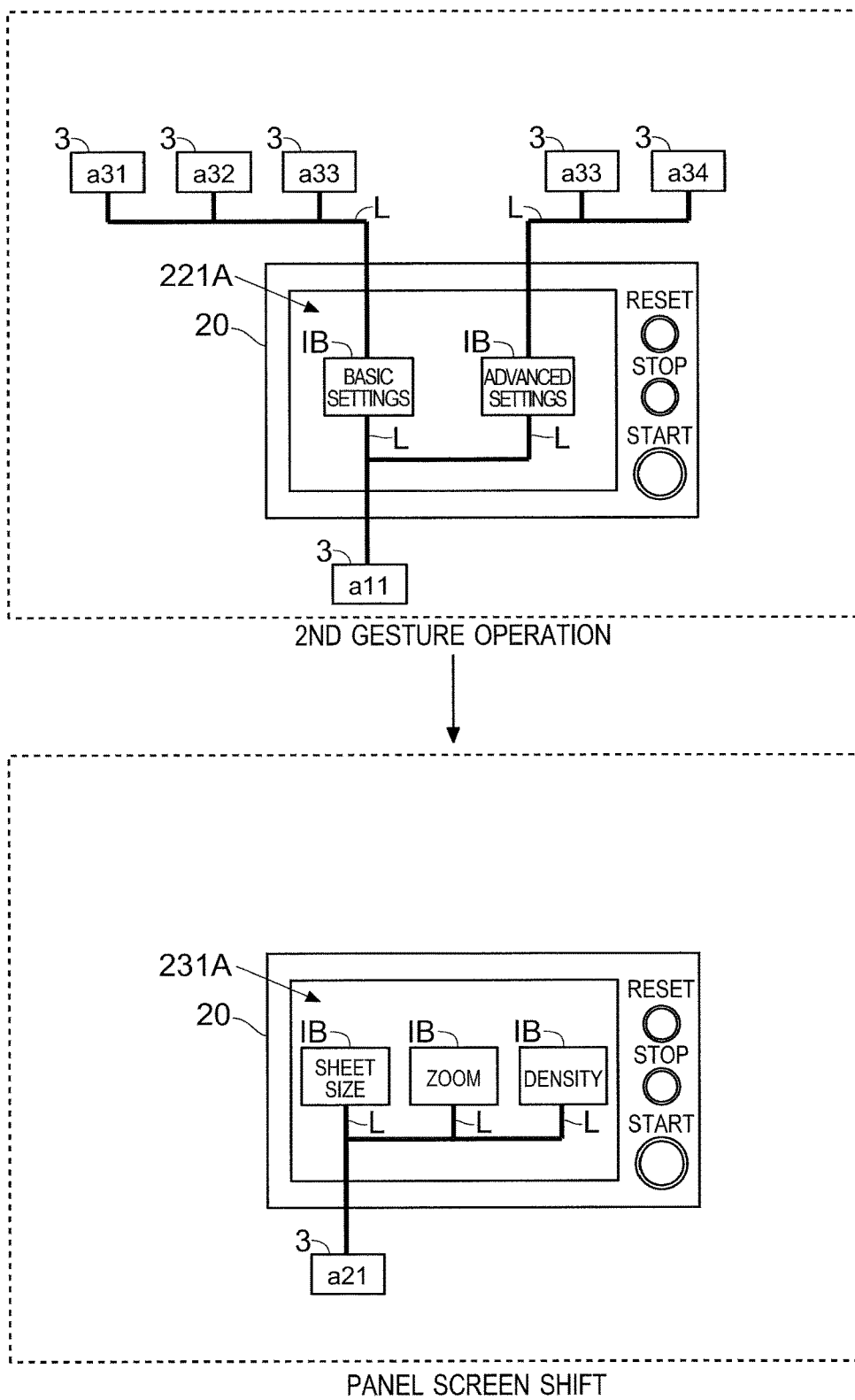
FIG. 16 is a diagram illustrating a second gesture operation accepted by the display apparatus according to the embodiment of the present disclosure.

For example, suppose that the operation panel 20 has performed a shift from the basic settings screen 231A to the basic/advanced selection screen 221A, and that, thereafter, as shown in the upper section of FIG. 16, in a state where the operation panel 20 continues to display the basic/advanced selection screen 221A, the second gesture operation is performed. In this case, as shown in the lower section of FIG. 16, the operation panel 20 performs a shift from the basic/advanced selection screen 221A to the basic settings screen 231A.

Moreover, during the display of the item information 3, the control portion 14 checks whether or not a previously defined third gesture operation has been performed. For example, the control portion 14 detects as the third gesture operation an operation of virtually flicking in the up-down direction in the shooting area of the camera portion 12.

On judging that the third gesture operation has been performed, the control portion 14 recognizes the currently displayed screen 200 that the operation panel 20 is currently displaying, and transmits to the operation panel 20 information containing a third command for making the operation panel 20 perform a shift to a screen 200 on the hierarchical level one level higher than the currently displayed screen 200. On receiving the third command, the operation panel 20 of the image forming apparatus 2 performs a shift to the screen 200 on the hierarchical level one level higher than the currently displayed screen 200. For example, when the third gesture operation is performed during the display of the sheet size screen 241A, the operation panel 20 performs a shift from the sheet size screen 241A to the basic settings screen 231A; when the third gesture operation is performed during the display of the basic settings screen 231A, the operation panel 20 performs a shift from the basic settings screen 231A to the basic/advanced selection screen 221A; when the third gesture operation is performed during the display of the basic/advanced selection screen 221A, the operation panel 20 performs a shift from the basic/advanced selection screen 221A to the home screen 211.

A HMD 1 (display apparatus) according to the present disclosure includes, as described above: a camera portion 12 which shoots an operation panel 20 that displays a screen 200 having an item button IB arranged in it and that accepts an operation on the item button IB from the user; a display portion 11 which displays information while allowing the user to see the operation panel 20; and a control portion 14 which recognizes, based on shot data obtained through the shooting of the operation panel 20 by the camera portion 12, the position of the operation panel 20 in the display area of the display portion 11 and the screen 200 currently being displayed by the operation panel 20 as a currently displayed screen and which makes the display portion 11 display item information 3 indicating the item description of the item button IB arranged on a screen 200 to which a shift is possible from the currently displayed screen 200 such that the item information 3 does not overlap the operation panel 20.

With the configuration according to the present disclosure, when the user, using the HMD 1, shoots the operation panel 20 (when the user, wearing the HMD 1, sees the operation panel 20), item information 3 is displayed that indicates the item description of the item button IB arranged on the screen 200 to which a shift is possible from the screen 200 currently being displayed on the operation panel 20. Thus, the user can know what item button IB is arranged on the screen 200 to which a shift is possible from the screen 200 currently being displayed on the operation panel 20. Here, the item information 3 is displayed not on the operation panel 20 but on the HMD 1. Moreover, the item information 3 is displayed in such a way as not to overlap the operation panel 20. This prevents the inconvenience of the screen 200 currently being displayed on the operation panel 20 overlapping the item information 3 and getting hard to see. That is, the user does not need to perform an operation to prevent overlap between the screen 200 currently being displayed on the operation panel 20 and the item information 3. This leads to enhanced user-friendliness.

According to the present disclosure, as described above, the control portion 14 makes the display portion 11 display, as the item information 3, information indicating the item description of the item button IB arranged on a screen 200 on a hierarchical level lower than the screen 200 currently being displayed on the operation panel 20. Thus, the user can know what item button IB is arranged on the screen 200 in the hierarchical level lower than the screen 200 currently being displayed on the operation panel 20. This leads to enhanced user-friendliness.

According to the present disclosure, as described above, the control portion 14 makes the display portion 11 display, as the item information 3, information indicating the item description of the item button IB that is arranged on a screen 200 on a hierarchical level higher than the screen 200 currently being displayed on the operation panel 20 and that is operated when a shift is performed to the screen 200 currently being displayed on the operation panel 20. Thus, the user can know the item button IB that the user operated when performing the shift to the screen 200 currently being displayed on the operation panel 20. This leads to enhanced user-friendliness.

According to the present disclosure, as described above, the control portion 14 recognizes, as a reference position, the position of the item button IB in the display area of the display portion 11 and makes the display portion 11 display a line connecting between the item information 3 and the reference position. Thus, the user can know the correspondence between the item information 3 displayed on the HMD 1 and the item button IB. This leads to enhanced user-friendliness.

According to the present disclosure, as described above, the control portion 14 makes the display portion 11 display notification information 30 when there is item information 3 that cannot be displayed in the display area of the display portion 11 (undisplayed item information). Thus, when there is undisplayed item information 3, the user can be notified of it.

According to the present disclosure, as described above, on recognizing based on the shot data obtained through the shooting by the camera portion 12 that a gesture operation previously defined as an item specifying operation has been performed, the control portion 14 recognizes the item information 3 specified by the item specifying operation as specified item information and transmits to the operation panel 20, by using the communication portion 15, information for making the operation panel 20 perform a shift to the screen 200 to be displayed when the item button IB corresponding to the specified item information 3 is operated. Thus, without directly operating the operation panel 20, the user can perform a shift from the current screen 200 on the operation panel 20 to the screen 200 that the user desires. This leads to enhanced user-friendliness.

According to the present disclosure, as described above, on recognizing that one of previously defined first to third gesture operations has been performed, the control portion 14 instructs the image forming apparatus 2 (operation panel 20) to perform screen shift processing associated with the detected operation. Thus, when the user wishes to perform a shift from the screen 200 currently being displayed on the operation panel 20 to a screen 200 on a higher hierarchical level or to a screen 200 on a lower hierarchical level, the user does not need to directly operate the operation panel 20. This leads to enhanced user-friendliness.

It should be understood that the embodiment disclosed herein is in every aspect illustrative and not restrictive. The scope of the present disclosure is defined not by the description of the embodiment given above but by the appended claims, and encompasses any modifications made in a sense and scope equivalent to those of the claims.

What is claimed is:

1. A display apparatus comprising:
   a camera portion which shoots an operation panel;
   a display portion which displays information while allowing the user to see the operation panel;
   a control portion
   which recognizes, based on shot data obtained through shooting of the operation panel by the camera portion, a position of the operation panel in a display area of the display portion, and
   a selection screen currently being displayed by the operation panel as a currently displayed screen, and
   which makes the display portion display item information such that the item information does not overlap the operation panel; and
   a storage portion which stores hierarchy information indicating a hierarchical structure of selection screens displayed by the operation panel, wherein
   the hierarchy information includes information indicating an item button arranged on each selection screen that the operation panel can display,
   the item button is a button for performing a shift to a selection screen on a one level lower hierarchical level,
   based on the hierarchy information, the control portion makes the display portion display, as the item information, information indicating an item description of the item button arranged on a selection screen on a hierarchical level lower than the currently displayed screen, and
   when a plurality of the item buttons are arranged on one selection screen, the item buttons correspond respectively to different selection screens on the one level lower hierarchical level.

2. The display apparatus according to claim 1, wherein the control portion makes the display portion display, as the item information, also information indicating an item description of the item button that is arranged on a selection screen on a hierarchical level higher than the currently displayed screen and that is operated when a shift is performed to the currently displayed screen.

3. The display apparatus according to claim 1, wherein the control portion
   recognizes, as a reference position, a position of the item button arranged on the currently displayed screen in the display area of the display portion, and
   makes the display portion display a line connecting between the reference position and the item information.

4. The display apparatus according to claim 1, wherein the control portion makes the display portion display notification information to notify the user, when there is a part of the item information that cannot be displayed in the display area of the display portion and is left as undisplayed item information, of presence of the undisplayed item information.

5. The display apparatus according to claim 1, further comprising:
   a communication portion for communication with an external appliance, wherein
   on recognizing based on the shot data obtained through shooting by the camera portion that, as an item specifying operation, an operation of virtually tapping the item information has been performed, the control portion
   recognizes the item information specified by the item specifying operation as specified item information, and
   transmits to the operation panel, by using the communication portion, information for making the operation panel perform a shift to a selection screen to be displayed when the item button corresponding to the specified item information is operated.

6. The display apparatus according to claim 1, further comprising:
   a communication portion for communication with an external appliance, wherein
   on recognizing based on the shot data obtained through shooting by the camera portion that a previously defined first gesture operation has been performed, the control portion transmits to the operation panel, by using the communication portion, information for making the operation panel perform a shift to a selection screen most recently displayed out of selection screens on a hierarchical level higher than the currently displayed screen, and
   the first gesture operation is an operation of virtually flicking in a first direction in a shooting area of the camera portion.

7. The display apparatus according to claim 1, further comprising:
   a communication portion for communication with an external appliance, wherein
   on recognizing based on the shot data obtained through shooting by the camera portion that a previously defined second gesture operation has been performed, the control portion transmits to the operation panel, by using the communication portion, information for making the operation panel perform a shift to a selection screen most recently displayed out of selection screens on a hierarchical level lower than the currently displayed screen, and
   the second gesture operation is an operation of virtually flicking in a second direction in a shooting area of the camera portion.

8. The display apparatus according to claim 1, further comprising:
   a communication portion for communication with an external appliance, wherein
   on recognizing based on the shot data obtained through shooting by the camera portion that a previously defined third gesture operation has been performed, the control portion transmits to the operation panel, by using the communication portion, information for making the operation panel perform a shift to a selection screen one level higher than the currently displayed screen, and the third gesture operation is an operation of virtually flicking in a third direction in a shooting area of the camera portion.

\* \* \* \* \*